(12) United States Patent
Orologio

(10) Patent No.: US 8,343,614 B2
(45) Date of Patent: *Jan. 1, 2013

(54) METALLIZED POLYMERIC FILM REFLECTIVE INSULATION MATERIAL

(76) Inventor: Furio Orologio, King (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/547,755

(22) Filed: Jul. 12, 2012

(65) Prior Publication Data

US 2012/0273501 A1  Nov. 1, 2012

Related U.S. Application Data

(60) Continuation of application No. 13/086,189, filed on Apr. 13, 2011, now Pat. No. 8,221,871, which is a division of application No. 11/507,658, filed on Aug. 22, 2006, now Pat. No. 7,935,410.

(30) Foreign Application Priority Data

Apr. 19, 2006  (CA) ...................... 2544098

(51) Int. Cl.
   *B32B 3/12*  (2006.01)
(52) U.S. Cl. .......... 428/178; 428/72; 428/920; 428/921; 52/407.5; 52/741.3
(58) Field of Classification Search ............... 52/169.11, 52/169.14, 396.06, 407.5, 408, 741.3, 745.05; 428/72, 76, 166, 178, 209, 212, 920, 921
   See application file for complete search history.

(56) References Cited

U.S. PATENT DOCUMENTS

| | | | | |
|---|---|---|---|---|
| 3,619,340 A | * | 11/1971 | Jones | ............................ 428/166 |
| 4,038,447 A | | 7/1977 | Brock | |
| 4,054,711 A | | 10/1977 | Botsolas | |
| 4,158,718 A | | 6/1979 | Kehl et al. | |
| 4,198,796 A | | 4/1980 | Foster | |
| 4,226,910 A | * | 10/1980 | Dahlen et al. | ................. 428/336 |
| 4,310,587 A | | 1/1982 | Beaupre | |
| 4,349,402 A | | 9/1982 | Parker | |

(Continued)

FOREIGN PATENT DOCUMENTS

CA    2218282    6/1999

(Continued)

OTHER PUBLICATIONS

ASTM International Standards No. C 1224-03—Standard Specification for Reflective Insulation for Building Applications—ASTM International—Oct. 1, 2003—pp. 1-5—USA.

(Continued)

*Primary Examiner* — Brian Glessner
*Assistant Examiner* — Adriana Figueroa
(74) *Attorney, Agent, or Firm* — Morgan Lewis & Bockius LLP

(57) ABSTRACT

A method of thermally insulating an object that requires a Class A standard insulation material, said method comprising suitably locating a metallized polymeric reflective insulation material adjacent said object, wherein said polymeric material is selected from a closed cell foam, polyethylene foam, polypropylene foam, expanded polystyrene foam, multi-film layers assembly and a bubble-pack assembly. The object is preferably packaging, a vehicle or a residential, commercial or industrial building or establishment. The polymeric material may contain a fire-retardant and the bright surface of the metallized layer has a clear lacquer coating to provide anticorrosion properties, and which maintains satisfactory reflectance commercial criteria.

21 Claims, 6 Drawing Sheets

U.S. PATENT DOCUMENTS

| | | | | |
|---|---|---|---|---|
| 4,401,706 | A | * | 8/1983 | Sovilla ..................... 428/158 |
| 4,535,828 | A | | 8/1985 | Brockhaus |
| 4,726,985 | A | | 2/1988 | Fay et al. |
| 4,825,089 | A | | 4/1989 | Lindsay |
| 4,826,534 | A | | 5/1989 | Shubow |
| 4,924,650 | A | | 5/1990 | Dalluge |
| 5,044,705 | A | | 9/1991 | Nelson |
| 5,393,598 | A | * | 2/1995 | Schlecker ..................... 442/186 |
| 5,428,093 | A | | 6/1995 | Lee |
| 5,549,956 | A | * | 8/1996 | Handwerker ..................... 428/73 |
| 5,601,670 | A | | 2/1997 | Rhoades |
| 5,681,660 | A | | 10/1997 | Bull et al. |
| 5,765,333 | A | * | 6/1998 | Cunningham ............... 52/481.1 |
| 5,820,268 | A | | 10/1998 | Becker et al. |
| 5,874,150 | A | | 2/1999 | Handwerker |
| 5,918,436 | A | | 7/1999 | Alderman |
| 6,092,584 | A | | 7/2000 | Humphries |
| 6,223,551 | B1 | | 5/2001 | Mitchell |
| 6,248,433 | B1 | | 6/2001 | Aanestad |
| 6,317,902 | B2 | | 11/2001 | Handwerker |
| 6,322,873 | B1 | * | 11/2001 | Orologio ..................... 428/178 |
| 6,514,596 | B1 | * | 2/2003 | Orologio ..................... 428/166 |
| 6,562,439 | B2 | * | 5/2003 | Orologio ..................... 428/178 |
| 6,599,850 | B1 | | 7/2003 | Heifetz |
| 6,828,012 | B2 | | 12/2004 | Groft et al. |
| 6,897,167 | B2 | | 5/2005 | Gordon |
| 7,000,359 | B2 | | 2/2006 | Meyer |
| 7,060,348 | B2 | * | 6/2006 | Creasy et al. ............... 428/304.4 |
| 7,465,484 | B2 | | 12/2008 | Handwerker |
| 2001/0031368 | A1 | * | 10/2001 | Aanestad ..................... 428/458 |
| 2002/0095861 | A1 | | 7/2002 | Trussell |
| 2002/0142684 | A1 | * | 10/2002 | Miska ............................. 442/63 |
| 2002/0197450 | A1 | * | 12/2002 | Orologio ..................... 428/178 |
| 2003/0059581 | A1 | | 3/2003 | Whalen |
| 2003/0061777 | A1 | * | 4/2003 | Alderman ..................... 52/407.3 |
| 2003/0100685 | A1 | | 5/2003 | Farkas |
| 2004/0048045 | A1 | * | 3/2004 | Thomsen et al. ............. 428/180 |
| 2004/0062919 | A1 | | 4/2004 | Kuchenmeister et al. |
| 2004/0159011 | A1 | | 8/2004 | Gordon |
| 2004/0185204 | A1 | | 9/2004 | Fay et al. |
| 2005/0011133 | A1 | | 1/2005 | Meyer |
| 2005/0022297 | A1 | * | 2/2005 | Orologio et al. .................. 4/498 |
| 2005/0031832 | A1 | * | 2/2005 | Kannankeril et al. ........ 428/178 |
| 2005/0058790 | A1 | | 3/2005 | Simon et al. |
| 2005/0106378 | A1 | | 5/2005 | Rives et al. |
| 2005/0118915 | A1 | | 6/2005 | Heifetz |
| 2005/0175843 | A1 | | 8/2005 | Johnson |
| 2006/0029777 | A1 | * | 2/2006 | Yanai ............................. 428/178 |
| 2006/0135011 | A1 | * | 6/2006 | Orologio et al. ................ 442/37 |
| 2006/0147696 | A1 | | 7/2006 | Crowley |

FOREIGN PATENT DOCUMENTS

| | | |
|---|---|---|
| CA | 2247782 | 3/2000 |
| CA | 2554754 | 12/2007 |
| CA | 2591589 | 4/2008 |
| EP | 0082131 | 6/1983 |
| EP | 1974619 | 10/2008 |
| FR | 2553713 | 4/1985 |
| FR | 2792667 | 10/2000 |
| FR | 2792668 | 10/2000 |
| GB | 2187512 | 2/1974 |
| GB | 2186253 | 8/1987 |
| GB | 2349356 | 11/2000 |
| JP | 2001065784 | 3/2001 |
| WO | WO 91/14828 | 10/1991 |
| WO | WO 98/10216 | 3/1998 |
| WO | WO 99/60222 | 11/1999 |
| WO | WO 02/05580 | 1/2002 |
| WO | WO 03/000494 | 1/2003 |
| WO | WO 2005/099496 | 10/2005 |
| WO | WO 2006/026728 | 3/2006 |

OTHER PUBLICATIONS

ASTM International Standards No. C 727-01—Standard Practice for Installation and Use of Reflective Insulation in Building Constructions—ASTM International—Oct. 10, 2001—pp. 1-3—USA.

Astro-Foil (Nov. 30, 2004), Retrieved from: http://web.archive.org/web/20041130173158/http://www.northlanddistrib.com/reflective-insulation/astro-foil.php.

Barn World, Foil-Bubble-Foil (FBF), Barn World Products (Feb. 14, 2006), Retrieved from: http://web.archive.org/web/20060214164227/http://www.barnworld.com/highr_FBF.asp.

Correspondence from Gary M. Hartman of Hartman & Hartman, P.C. dated Apr. 18, 2011.

Extended European Search Report issued in a related European Application No. 07719557.6, dated Jan. 20, 2012.

Fi-Foil, Reflective Bubble Insulation, Fi-Foil Company (Apr. 2004), Retrieved from: http://www.idimn.com/pdf/insulation/reflective-insulation/RBI-Shield/ReflectiveBubbleSpecSheet.pdf.

Harrison "Investigation of Reflective Materials for the Solar Cooker" Florida Solar Energy Center (Dec. 24, 2001), Retrieved from: http://www.fsec.ucf.edu/en/research/solarthermal/solar_cooker/documents/reflectivematerialsreport.pdf.

Heatshield II—Performance Specification—Astro-Foil International LLC—Sep. 1, 1998—USA.

International Search Report for PCT/CA2001/00892, mailed Mar. 6, 2002.

Invoice No. 00021522—Innovative Energy, Inc.—Apr. 29, 1999—p. 1—USA.

Radco Test Report—Test Report No. RAD-3278—Prepared for Pactiv Building Projects—May 2003—16 pages—Long Beach—California—USA.

Reflectix, Inc.—Sales History by Location / Itern—Itern MDB1 through MDBMH4815—Feb. 1, 2007—pp. 1-2—USA.

Report of Test—ASTM E-84 Standards—Flarne Spread Classification and Srnoke Density Developed—Reflectix, Inc.—92 Gage Metalized Double Bubble Reflective Insulation—Test Report No. 187082-2—Prepared for Reflectix, Inc.—United States Testing Company, Inc.—Decernber 17, 1991—pp. 1-6—Los Angeles—California—USA.

Test Report—ASTM E-84-00 Standards—Flame Spread and Smoke Developed Values—Reflectix, Inc.—Metalized Scrirn "rFoil"—Test Report No. 158512—Prepared for Covertech Fabricating Inc.—SGS U.S. Testing Company Inc.—Aug. 2, 2001—4 pages—Fairfield—New Jersey—USA.

Test Report—ASTM E84-5 Standards—Surface Burning Characteristics of Building Materials—Reflectix, Inc.—MB2MAC1—Metalized/Double Bubble/Metalized, Mounted to Metal Frarne, Material Exposed—Test Report No. 3095375SAT-005—Prepared for R&D Services, Inc.—Intertek Testing Services NA—Apr. 11, 2006—pp. 1-9—Elrnendorf—Texas—USA.

Test Report—ASTM E84-98 Standards—Surface Burning Characteristics—Reflectix, Inc.—Metalized Bubblepak Product (New)—Report No. 15498-104319—Prepared for R&D Services, Inc.—Omega Point Laboratories, Inc.—Dec. 28, 1998—10 pages—Cookeville—Tennessee—USA.

The extended European search report dated Jun. 24, 2011 in the technically related European Patent Application No. 11275020.3.

Thermo-Brite Radiant Barrier—Radiant Barrier System for Energy Conversation—Parsec Product Bulletin No. 200-1—Jun. 1984—pp. 1-7—USA.

* cited by examiner

METALLIZED POLYMERIC FILM REFLECTIVE INSULATION MATERIAL

This application is a Continuation Application of U.S. patent application Ser. No. 13/086,189, filed Apr. 13, 2011 now U.S. Pat. No. 8,221,871, which is a Divisional Application of U.S. patent application Ser. No. 11/507,658, filed Aug. 22, 2006, now U.S. Pat. No. 7,935,410, which claims priority to Canadian Application No. 2,544,098, filed Apr. 19, 2006, all of which are hereby incorporated by reference in their entirety.

FIELD OF THE INVENTION

This invention relates to metallized polymeric reflective insulation material, particularly, bubble pack insulation material for use in an environment that requires a Class A standard insulation material, particularly, as packaging, and in vehicles, and, more particularly, in residential, commercial and industrial buildings and establishments comprising a framed structure, walls, crawl spaces and the like, and wrapping for water heaters, pipes and the like.

BACKGROUND OF THE INVENTION

Insulation materials are known which comprise a clean, non-toxic, heat barrier made of aluminum foil bonded to polymeric materials.

Examples of such insulation materials, includes aluminum foil backing with foam materials selected from closed cell foams, polyethylene foams, polypropylene foams and expanded polystyrene foams (EPS).

Alternative insulation materials in commercial use are made from aluminum foil bonded to a single or double layer of polyethylene-formed bubbles spaced one bubble from another bubble in the so-called "bubble-pack" arrangement. Such non-foil bubble-packs are used extensively as packaging material, whereas the metal foil bubble-pack is used as thermal insulation in wood frame structures, walls, attics, crawl spaces, basements and the like and as wrapping for hot water heaters, hot and cold water pipes, air ducts and the like. The reflective surface of the metal, particularly, aluminum foil enhances the thermal insulation of the air-containing bubble pack.

Organic polymers, such as polyethylene, are generally considered to be high-heat-release materials. They can easily initiate or propagate fires because, on exposure to heat, they undergo thermal degradation to volatile combustible products. If the concentration of the degradation products in the air is within flammability limits, they can ignite either spontaneously, if their temperature is large enough, or by the effect of an ignition source such as a spark or flame. The ignition of polyethylene can be delayed and/or the rate of its combustion decreased by means of fire retardant materials.

The ultimate aim of fire retardants is to reduce the heat transferred to the polymer below its limit for self-sustained combustion or below the critical level for flame stability. This can be achieved by decreasing the rate of chemical and/or physical processes taking place in one or more of the steps of the burning process. One or a combination of the following can achieve fire extinguishing:

1. creation of a heat sink by using a compound that decomposes in a highly endothermic reaction, giving non-combustible volatile products, which perform a blanketing action in the flame, e.g., aluminum or magnesium hydroxide;

2. enhancements of loss of heat and material from the surface of the burning polymer by melt dripping, e.g., mixture of halogenated compounds with free radical initiators;

3. flame poisoning by evolution of chemical species that scavenge H and OH radicals which are the most active in propagating thermo-oxidation in the flame, e.g., hydrogen halides, metal halides, phosphorus-containing moieties;

4. limitation of heat and mass transfer across the phase boundary, between thermal oxidation and thermal degradation by creation of an insulating charred layer on the surface of the burning polymer, e.g., intumescent chart; or 5. modification of the rate of thermal volatilization of the polymer to decrease the flammability of the volatile products; which approach strongly depends on the chemical nature of the polymer.

Fire retardant materials are generally introduced to the polyethylene as merely additives or as chemicals that will permanently modify its molecular structure. The additive approach is more commonly used because it is more flexible and of general application.

Generally, low density polyethylene films of 1-12 mil, optionally, with various amounts of linear low density polyethylene in admixture when additional strength is required, are used for the above applications. The insulating properties of the bubble pack primarily arise from the air in the voids. Typically, bubble diameters of 1.25 cm, 0.60 cm and 0.45 cm are present.

Regardless of the application method of fire retardant material(s), a satisfactory insulative assembly must have a fire rating of Class A with a flame spread index lower than 16, and a smoke development number smaller than 23. Further, the bonding of the organic polymer films and their aging characteristics must meet the aforesaid acceptable standards. Yet further, the fabrication method(s) of a new fire retardant system or assembly should be similar to the existing technology with reasonable and cost effective modifications to the existing fabrication system/technology. Still yet further, other physical properties of an improved fire standard system must at least meet, for example, the standard mechanical properties for duct materials as seen by existing competitive products.

Fire retardant polyethylene films, wires and cables containing a fire retardant material in admixture with the polyethylene per se are known which generally satisfy cost criteria and certain fire retardant technical standards to be commercially acceptable.

Conventional fire retardant additives are usually compounds of small molecular weights containing phosphorus, antimony, or halogens. The most effective commercially available fire retardant systems are based on halogen-containing compounds. However, due to concerns over the environmental effects of such halogenated compounds, there is an international demand to control the use of such halogenated additives.

Some of the most common halogenated agents are methyl bromide, methyl iodide, bromochlorodifluoromethane, dibromotetrafluoroethane, dibromodifluoromethane and carbon tetrachloride. These halogenated fire retarding materials are usually available commercially in the form of gases or liquids. Unlike chlorine and bromine, fluorine reduces the toxicity of the material and imparts stability to the compound. However, chlorine and bromine have a higher degree of fire extinguishing effectiveness and, accordingly, a combination of fluorine and either chlorine or bromine is usually chosen to obtain an effective fire-retarding compounds.

Other commercially available fire retardant materials that do not include halogens include boric acid and borate based compounds, monoammonium phosphonate, and urea-potassium bicarbonate.

Intumescent compounds which limit the heat and mass transfer by creating an insulating charred layer on the surface of the burning polymer are also considered fire retardant materials. A typical intumescent additive is a mixture of ammonium polyphosphate and pentaerythritol.

Fire retardant additives are often used with organic polymer/resins. Typically, a brominated or chlorinated organic compound is added to the polymer in admixture with a metal oxide such as antimony oxide. Halogenated compounds are also sometimes introduced into the polymer chain by co-polymerization. Low levels i.e. less than 1% W/W are recommended to make adverse effects of halogen-based systems negligible. Another common fire retardant additive is diglycidyl ether of bisphenol-A with $MoO_3$. Other additives to improve the fire retarding properties of polyethylene include, for example, beta-cyclodextrin, magnesium hydroxide and alumina trihydrate, tin oxide, zinc hydroxystannate, and chlorosulphonated polyethylene.

U.S. Pat. No. 6,322,873, issued Nov. 27, 2001 to Orologio, Furio, describes a thermally insulating bubble pack for use in framed structures, walls, crawl spaces and the like; or wrapping for cold water heaters, pipes and the like wherein the bubbles contain a fire retardant material. The improved bubble pack comprises a first film having a plurality of portions wherein each of the portions defines a cavity; a second film in sealed engagement with the first film to provide a plurality of closed cavities; the improvement comprising wherein the cavities contain a fluid or solid material. The flame retardant-containing bubble pack provides improved fire ratings, flame spread indices and smoke development numbers. The preferred embodiments include a layer of metal or metallized film adjacent at least one of the films. However, the efficacious manufacture of the fire retardant-filled bubbles still represents a challenge.

Aforesaid bubble-packs not containing fire retardant materials and having a metallized film layer are known and used for external insulation around large self-standing structures, such as tanks, silos and the like, particularly in the oil and chemical industries, which insulation assembly does not have to meet the rigorous fire retardant standards for insulation in framed structures of residential, commercial and industrial buildings, crawl spaces and the like or wrappings for cold water heaters, pipes and the like, therein.

Metallized films and their methods of production are well-known in the art. One technique is to evaporate an extremely thin layer of nearly pure aluminum onto a surface of the non-porous plastics material under vacuum by a so-called 'vacuum metallizer'. Preferred metallized films of use in the practise of the invention are metallized aluminum coated polymer films, preferably, for example, 48 gauge PET (polyethylene terephthalate).

There is, however, always the need for insulation assembly, having improved fire retardant standards, particularly when safety building codes are being continually improved.

Standards for many products are generally being raised to enhance safety. This is true for reflective insulation materials for use in buildings, which must meet minimum surface burning characteristics to satisfy codes, such as CAN/ULC S201, UL723, ANSI No. 2.5, NFPA No. 255 and 286, UBC 42-1, ASTM E84-05 and others. These tests cover two main parameters, mainly, Flame Spread and Smoke Developed Values.

Such reflective insulation materials are classified as meeting the ratings as follows:

| Interior Wall and Ceiling Finish | Flame Speed Value | Smoke Developed Value |
| --- | --- | --- |
| Class A | 0-25 | 0-450 |
| Class B | 26-75 | 0-450 |
| Class C | 76-200 | 0-450 |

The classification determines the environmental allowability of the reflective materials insulation.

The standard ASTM E84 and its variations tests, to date, have included, typically, the use of a hexagonal 50 mm steel wire mesh with 6 mm diameter steel rods spaced at 610 mm intervals to support the insulation materials.

Without being bound by theory, the skilled persons in the art have discovered that the aforesaid use of the wire mesh support in the tests has enabled some reflective insulation materials to satisfy the Class A standard, whereas removal of the support in the test has caused these materials not to meet the standard.

Surprisingly, I have discovered that substitution of metallic foil, particularly, aluminum foil, with a metallized, particularly, aluminum, coating on an organic polymer layer, e.g. polyethylene and more particularly PET (polyethylene terephthate), favourably enhances the surface burning characteristics of the reflective insulation in the aforesaid ASTM E84 test in the absence of the wire mesh support. The reason for this discovery is not, as yet, understood.

Further, I have discovered that the presence of a fire retardant compound in or on one or more of the polymer layers of a reflective insulation assembly further favourably enhances the surface burning characteristics of the insulation, and in preferred embodiments significantly enhances the safety of the assemblies as to satisfy the criteria set in the most stringent "Full Room Burn Test for Evaluating Contribution of Wall and Ceiling Finishes to Room Fire Growth—NFPA 286.

Metallized polymeric films having an outer lacquer coating are known in the foodstuff packaging industry in order to provide physical protection to the ink printed on the outer metallic surface. Manual contact with the unprotected inked material surface would cause inconvenience to the person and possibly contamination of the foodstuffs, such as confectionery and potato chips when handed by the person. The lacquer-coated outer metallic surface overcomes this problem in the foodstuff art.

Surprisingly, I have found that the most preferred metallized polymeric film reflective insulation materials, particularly the fire-retardant containing assemblies, according to the invention provide improved safety towards fire and acceptable reflectance and anti-corrosive properties.

SUMMARY OF THE INVENTION

It is an object of the present invention to provide metallized polymeric film reflective insulation material having Class A thermal insulation properties, particularly, metallized bubble pack insulation material for use in an environment that requires a Class A standard insulation material, particularly, as packaging, and in vehicles, and more particularly in residential, commercial and industrial buildings and establishments having framed structures, walls, crawl spaces and the like, and wrapping for water heaters, pipes and the like having improved fire retardant properties.

It is a further object to provide a method of thermally insulating an aforesaid vehicle, building or establishment with a Class A standard metallized polymeric reflective insulation material having improved fire-retardant properties.

In yet a further object, the invention provides an improved thermally-insulated vehicle, building or establishment having a Class A standard metallized polymeric reflective insulation material.

Accordingly, the invention in one aspect provides a method of thermally insulating an object that requires a Class A standard insulation material, said method comprising suitably locating a metallized polymeric reflective insulation material adjacent said object, wherein said polymeric material is selected from a closed cell foam, polyethylene foam, polypropylene foam, expanded polystyrene foam, multi-film layers assembly and a bubble-pack assembly.

Without being limiting, the object is preferably selected from the group consisting of vehicles and residential, commercial and industrial building and establishment.

The term 'vehicle' includes, for example, but not limited to, automobiles, buses, trucks, train engines and coaches, ships and boats.

The invention provides in a further aspect, a method of thermally insulating a residential, commercial or industrial building with a metallized polymeric material, said method comprising locating said metallized polymeric material within a frame structure, crawl space and the like, or wrapping water heaters, pipes, and the like, within said building, wherein said polymeric material is selected from a closed cell foam, polyethylene foam, polypropylene foam, expanded polystyrene foam and a bubble-pack assembly.

The invention provides in a further aspect a method of thermally insulating a residential, commercial or industrial building with a bubble-pack assembly, said method comprising locating said bubble pack within a framed structure, wall, crawl space and the like, or wrapping water heaters, pipes and the like within said building; and wherein said bubble-pack assembly comprises a first thermoplastic film having a plurality of portions wherein each of said portions defines a cavity; a second film in sealed engagement with said first film to provide a plurality of closed said cavities; and at least one layer of metallized thermoplastic film.

The terms "cavity" or "cavities" in this specification include voids, bubbles or other like closed spaces. The cavities may be formed of any desired suitable shapes. For example, semi-cylindrical, oblong or rectangular. However, a generally, hemi-spherical shape is preferred.

Most surprisingly, I have found that the use of at least one layer of metallized thermoplastic film provides enhanced fire retardant properties over those having only a corresponding layer(s) of aluminum foil, in the bubble-pack assembly.

In a further aspect, the invention provides a method as hereinabove defined wherein said bubble-pack assembly comprises
(i) a first bubble pack having a first thermoplastic film having a plurality of portions wherein each of said portions defines a cavity and a second thermoplastic film in sealed engagement with said first film to provide a plurality of closed said cavities; and
(ii) a second bubble-pack having a third thermoplastic film having a plurality of portions wherein each of said portions defines a cavity and a fourth thermoplastic film in sealed engagement with said third film to provide a plurality of closed said cavities; provided that when said at least one of said layers of metallized thermoplastic film is interposed between and bonded to said first bubble pack and said second bubble pack, said assembly comprises at least one further metallized thermoplastic film.

In a further aspect, the invention provides a method as hereinabove defined wherein said bubble-pack assembly comprises
(i) a first bubble pack having a first thermoplastic film having a plurality of portions wherein each of said portions defines a cavity and a second thermoplastic film in sealed engagement with said first film to provide a plurality of closed said cavities; and
(ii) a second bubble-pack having a third thermoplastic film having a plurality of portions wherein each of said portions defines a cavity and a fourth thermoplastic film in sealed engagement with said third film to provide a plurality of closed said cavities;
(iii) a metallized thermoplastic film interposed between and bonded to said first bubble pack and said second bubble pack; and wherein at least one of said first second, third, fourth or additional thermoplastic films contains an effective amount of a fire-retardant material.

The assembly, as hereinabove defined, may have at least one outer layer of metallized thermoplastic film, or, surprisingly, one or more inner, only, layers.

The assembly may, thus, further comprise at least one or a plurality of additional thermoplastic films.

Further, I have found that the use of a fire-retardant material in any or all of the thermoplastic films of the assembly enhances the fire-retardant properties of the assembly.

Accordingly, in a further aspect, the invention provides a bubble-pack assembly comprising
(i) a first thermoplastic film having a plurality of portions wherein each of said portions defines a cavity;
(ii) a second film in sealed engagement with said first film to provide a plurality of closed said cavities; and
(iii) at least one layer of a metallized thermoplastic film; and wherein at least one of said first or second films contains an effective amount of a fire-retardant.

In a further aspect, the invention provides a bubble-pack assembly comprising
(i) a first bubble pack having a first thermoplastic film having a plurality of portions wherein each of said portions defines a cavity and a second thermoplastic film in sealed engagement with said first film to provide a plurality of closed said cavities; and
(ii) a second bubble-pack having a third thermoplastic film having a plurality of portions wherein each of said portions defines a cavity and a fourth thermoplastic film in sealed engagement with said third film to provide a plurality of closed said cavities.

Further, the metallized thermoplastic film may also contain a fire-retardant material to further enhance the assemblies' fire-retardant properties.

The thermoplastic films may be formed of any suitable polymer or copolymer material. The first and second film may be formed of the same or different material. Most preferably, the bubble pack has each of the films formed of a polyethylene.

The metallized thermoplastic film is preferably a polyester, and, more preferably, a polyethylene terephthate having a metal coating.

The fire retardant material may be a compound or composition comprising one or more compounds having acceptable fire retardant properties.

The amount of fire retardant material is such as to provide an efficacious amount in relation to the amount of plastic and other components present in the bubble pack. Thus, the amount of fire retardant material required will depend on the application of the assembly, the type and effectiveness of the fire retardant material used, the final properties required e.g. flame spread index, slow burning or self-extinguishing, and the bubble size. The fire retardant is generally present in an amount selected from 0.1-70% w/w, more preferably, 10-60% w/w, preferably 15-20% w/w in relation to the thermoplastic film.

Examples of suitable fire retardants of use in the practice of the invention, include those classes and compounds as hereinbefore described. Preferably, the fire retardant compound is selected from alumina trihydrate (ATH, hydrated aluminum oxide, $Al_2O_3.3H_2O$), oxides of antimony, decabromodiphenyl oxide and mixtures of these compounds, optionally with a dimethyl siloxine fluid (DC200).

The bubble-pack further comprises one or more organic polymer films metallized with a suitable metal, for example, aluminum to enhance reflection of infra-red radiation.

Thus, while the most preferred plastics material for the bubble and laminated layers is polyethylene, particularly a low-density polyethylene, optionally, in admixture with a linear low density polyethylene, of use as aforesaid first and second films, the metallized organic polymer is a polyester, preferably polyethylene teraphthalate.

The number, size and layout of the bubbles in the pack according to the invention may be readily selected, determined and manufactured by the skilled artisan. Typically, in a single pack, the bubbles are arrayed in a coplanar off-set arrangement. Each of the hemi-spherical bubbles may be of any suitable diameter and height protruding out of the plane of the bonded films. Typically, the bubble has a diameter selected from 0.5 cm-5 cm, preferably 0.8-1.5 cm; and a height selected from 0.2 cm-1 cm, preferably 0.4-0.6 cm. A preferred bubble pack has an array of about 400 bubbles per 900 $cm^2$.

In a further aspect, the invention provides a vehicle or a residential, commercial or industrial building or establishment insulated with a multi-film layer or bubble-pack assembly, according to the invention Surprisingly, I have also discovered that a clear polymeric lacquer coating applied to the metallic layer having the higher reflectivity (bright) surface as the outer layer provides a protective layer to manual handling without significant loss of reflectance. Thus, I also have found that a suitable and effective thickness of the lacquer polymeric coating can provide satisfactory anti-corrosion protection to the metal surface and still allow of sufficient reflectance as to meet the emissivity standard as set by the industry. A reflectance of greater than 95% has been maintained for preferred embodiments of the clear lacquer-coated metallized polymeric reflective insulation materials, according to the invention. A preferred lacquer comprises an acrylic polymer or copolymer. More preferably, the acrylic polymer is polymethyl methacrylate, particularly having a molecular weight of 80,000-150,000.

Accordingly, in a further aspect the invention provides a metallized polymeric reflective film insulation material, as hereinabove defined and having a metallic coating outer layer having a clear lacquer coating.

The clear lacquer coating may be applied to the highest reflectance surface, i.e. the bright side, of the metallic surface by techniques, such as by brushing, spraying, deposition and the like, as is well-known in the art. Preferred lacquers are clear, cross-linked polymers well-known in the art.

I have also found that preferred embodiments of the aforesaid lacquer-coated, metallized polymeric insulative materials according to the invention provide satisfactorily meet the industry's corrosivity standards.

BRIEF DESCRIPTION OF THE DRAWINGS

In order that the invention may be better understood, preferred embodiments will now be described by way of example only, with reference to the accompanying drawings wherein.

DETAILED DESCRIPTION OF PREFERRED EMBODIMENTS

Figure 14:
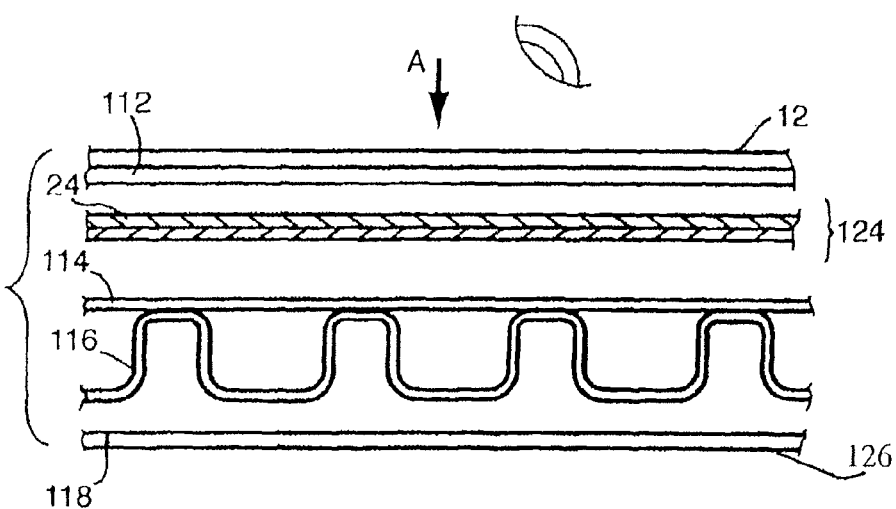
FIGS. 14, 15 and 16 are diagrammatic, exploded sectional views of a bubble-pack, scrim laminated insulation blanket, according to the invention.

FIG. 14 is a bubble-pack-scrim laminated blanket assembly having polyethylene layers 112, 114, 116 and 118 and scrim layer 126 with nylon tapes 124 laminated between layers 112 and 114. Adhered to outer layer 112 is a metallized PET layer 12.

Figure 15:
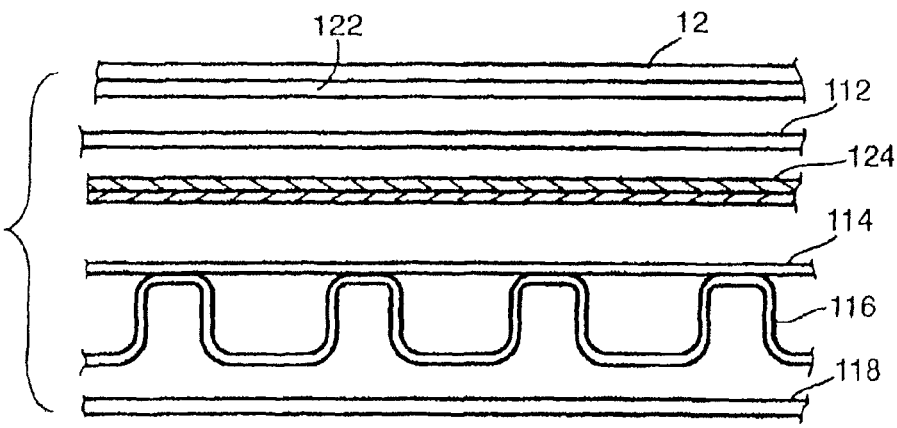
Figure 16:
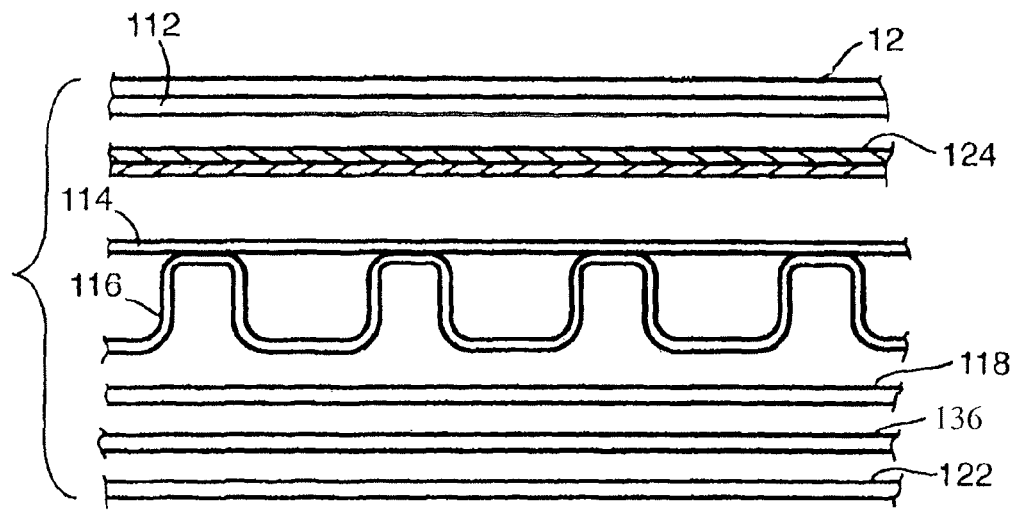

FIGS. 15 and 16 represent the embodiment of FIG. 14 but, additionally, having an aluminum foil layer 122 laminated to layer 112 in FIG. 15 and to layer 118, via a polyethylene layer 136 in FIG. 16.

The following numerals denote the same materials throughout the drawings, as follows:
  12—48 gauge aluminum metallized polyester (PET) film;
  14—adhesive;
  16—1.2 ml polyethylene film;
  18—2.0 ml polyethylene film (bubbled);
  20—1.2 ml ethylene vinyl acetate—polyethylene film;
  22—2.0 ml polyethylene film;
  24—aluminum foil;
  26—polyester scrim;
  FR denotes 18% w/w antimony oxide fire retardant;
  W denotes presence of $TiO_2$ pigment (white).

The bubble pack layer is preferably of a thickness selected from 0.5 cm to 1.25 cm. The other polyethylene layers are each of a thickness, preferably, selected from 1 to 6 mls.

The fire retardant material of use in the preferred embodiments was antimony oxide at a concentration selected from 10-20% w/w.

Insulation material No. 1 was a prior art commercial single bubble pack assembly of a white polyethylene film (1.2 mil) laminated to a polyethylene bubble (2.0 mil) on one side and aluminum foil (0.275 mil) on the other.

Insulation material No. 2 was a metallized polymeric material of use in the practise of the invention in the form of a bubble pack as for material No. 1 but with the aluminum foil substituted with metallized aluminum on polyethylene terephthalate (PET) film (48 gauge) adhered to the polyethylene bubble.

Test

A blow torch was located about 10-15 cm away from the insulation material (5 cm×10 cm square) and directed at each of the aluminum surfaces.

Results

Single Bubble Aluminum Foil. Material No. 1 started to burn immediately and continued burning until all organic material was gone. Flame and smoke were extensive.

Single Bubble Metallized Aluminum Material. For material No. 2, where the flame was directly located, a hole was produced. However, the flame did not spread outwards of the hole or continue to burn the material. Flame and smoke were minimal.

Conclusion. Single Bubble metallized material reacts better to the flame, that is the material burned where the flame was situated but did not continue to burn.

Clearly, this test shows the advance of the metallized insulation material according to the invention over its prior art aluminum foil counterpart.

EXAMPLES 1 AND 2

Underwent Full Room Burn Tests

Example 1

Figure 1:
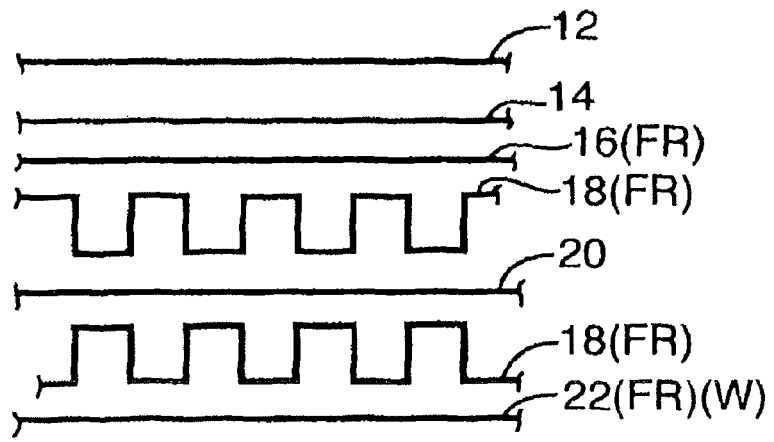
FIG. 1 represents diagrammatic, exploded section views of a metallized-double bubble-white polyethylene, with fire retardant, assembly according to the invention (Example 1)

This Example illustrates the testing of the bubble-pack assembly shown in FIG. 1—being commonly known as a metallized-double bubble-white poly (FR) in accordance with NFPA 286 Standard Methods of Fire Tests for Evaluating Contribution of Wall and Ceiling Interior Finish to Room Fire Growth. The test material was mounted on the LHS, rear, RHS walls to a height of the test room as well as the ceiling of the test room. The sample did not spread flames to the ceiling during the 40 kW exposure. The flames did not spread to the extremities of the walls during the 160 kW exposure. The sample did not exhibit flashover conditions during the test. NFPA 286 does not publish pass/fail criteria. This specimen did meet the criteria set forth in the 2003 IBC Section 803.2.1.

The test was performed by Intertek Testing Services NA, Inc., Elmendorf, Tex., 78112-984; U.S.A.

This method is used to evaluate the flammability characteristics of finish wall and ceiling coverings when such materials constitute the exposed interior surfaces of buildings. The test method does not apply to fabric covered less then ceiling height partitions used in open building interiors. Freestanding panel furniture systems include all freestanding panels that provide visual and/or acoustical separation and are intended to be used to divide space and may support components to form complete work stations. Demountable, relocatable, full-height partitions include demountable, relocatable, full-height partitions that fill the space between the finished floor and the finished ceiling.

This fire test measures certain fire performance characteristics of finish wall and ceiling covering materials in an enclosure under specified fire exposure conditions. It determines the extent to which the finish covering materials may contribute to fire growth in a room and the potential for fire spread beyond the room under the particular conditions simulated. The test indicates the maximum extent of fire growth in a room, the rate of heat release, and if they occur, the time to flashover and the time to flame extension beyond the doorway following flashover.

General Procedure

A calibration test is run within 30 days of testing any material as specified in the standard. All instrumentation is zeroed, spanned and calibrated prior to testing. The specimen is installed and the diffusion burner is placed. The collection hood exhaust duct blower is turned on and an initial flow is established. The gas sampling pump is turned on and the flow rate is adjusted. When all instruments are reading steady state conditions, the computer data acquisition system and video equipment is started. Ambient data is taken then the burner is ignited at a fuel flow rate that is known to produce 40 kW of heat output. This level is maintained for five minutes at which time the fuel flow is increased to the 160 kW level for a 10-minute period. During the burn period, all temperature, heat release and heat flux data is being recorded every 6 seconds. At the end of the fifteen minute burn period, the burner is shut off and all instrument readings are stopped. Post test observations are made and this concludes the test.

All damage was documented after the test was over, using descriptions, photographs and drawings, as was appropriate.

Digital color photographs and DV video taping were both used to record and documents the test. Care was taken to position the photographic equipment so as to not interfere with the smooth flow of air into the test room.

The test specimen was a metallized/double bubble/white poly (FR) insulation. Each panel measured approximately 4 ft. wide×8 ft. tall×⅛ in. thick. Each panel was white in color. The insulation was positioned using metal C studs every 2 ft. o.c. with the flat side of the stud facing the interior of the room. The insulation was attached to the C studs using screws and washers. See Photos in Appendix B for a visual depiction of the description above.

All joints and corners in the room were sealed to an airtight condition using gypsum drywall joint compound and/or ceramic fiber insulation. See photos in the appendix fort a detailed view of the finished specimen.

The data acquisition system was started and allowed to collect ambient data prior to igniting the burner and establishing a gas flow equivalent to 40 kW for the first 5 minutes and 160 kW for the next 10 minutes. Events during the test are described below:

| TIME (min:sec) | OBSERVATION |
|---|---|
| 0:00 | Ignition of the burner at a level of 40 kW. |
| 0:20 | Specimen surface began to melt. |
| 0:45 | The specimen began to melt at 4 ft. above the specimen. |
| 0:55 | Ignition of the specimen at the melting edge. |
| 1:25 | Melting of the specimen at 8 ft. above the test burner. |
| 3:20 | Ignition of the specimen at the RHS edge of melt pattern. |
| 3:38 | Flaming drops began to fall from the specimen. |
| 4:00 | Burning on metal side of specimen only. |
| 5:00 | Burner output increased to 160 kW. |
| 5:18 | Specimen began to rapidly melt away. |
| 5:25 | The specimen began to melt away at 6 ft. from the test corner. |
| 6:20 | No burning of the specimen observed. |
| 8:20 | Material fell in front of the doorway. |
| 9:00 | TC # 5 fell in front of the doorway. |
| 12:00 | No new activity. |
| 14:00 | No changes observed in the specimen. |
| 15:00 | Test terminated. |

Post Test Observations:

The specimen was completely melted on the top portions along all three walls. On the lower LHS wall, the specimen was still intact and appeared to have no visible damage. The lower rear wall appeared to have melting 4 ft. from the test corner, with the specimen intact from 4-8 ft from the test corner. The lower RHS wall was melted 4 ft. from the test corner and appeared intact from 4 ft. to the doorway. The specimen on the ceiling panels was observed to have been 100% melted.

Conclusion

The sample submitted, installed, and tested as described in this report displayed low levels of heat release, and upper level temperatures. The sample did not spread flames to the ceiling during the 40 kW exposure. The flames did not spread to the extremities of the 12-foot walls during the 106 kW exposure. The sample did not exhibit flashover conditions during the test. NFPA 286 does not publish pass/fail criteria. One must consult the codes to determine pass fail. This specimen did meet the criteria set forth in the 2003 IBC Section 803.2.1.

Example 2

Figure 2:
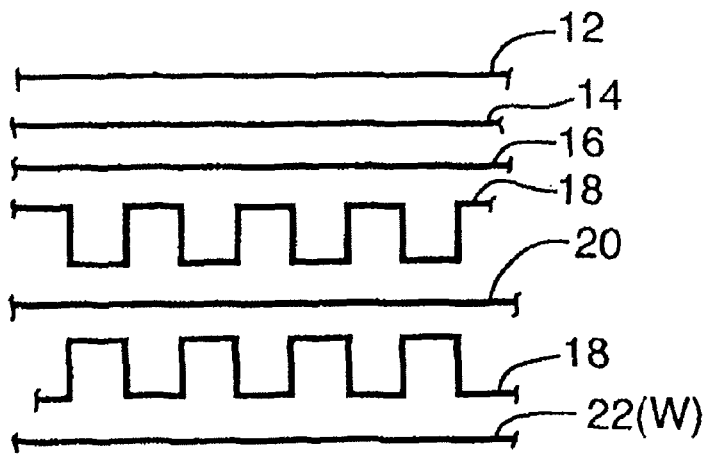
FIG. 2 represents the assembly of FIG. 1 without fire retardant being present, according to the invention (Examples 2 and 3)

The test described under Example 1 was repeated but with a metallized double bubble/white poly not containing fire retardant as shown in FIG. 2.

The sample did not spread flames to ceiling during the 40 kW exposure. The flames did spread to the extremities of the walls during the 106 kW exposure. The sample did not exhibit flashover conditions during the test. NFPA 286 does not publish pass/fail criteria. However, this specimen did not meet the criteria set forth in the 2003 IBC Section 803.2.1.

Events during the test are described below:

| TIME (min:sec) | OBSERVATION |
|---|---|
| 0:00 | Ignition of the burner at a level of 40 kW. |
| 0:14 | Specimen surface began to melt. |
| 0:20 | The edge of the specimen ignited. |
| 0:38 | The specimen began to melt 6-7 ft. above the burner/flaming drops began to fall from the specimen. |
| 1:21 | Flame spread at 2 ft. horizontally at 4 ft. above the test burner. |
| 2:31 | Flame spread at 4 ft. horizontally at 4 ft. above the test burner. |
| 3:50 | The specimen on the ceiling began to fall. |
| 4:24 | The specimen began to fall from the corners and ceiling. |
| 5:00 | Burner output increased to 160 kW/specimen continuing to fall. |
| 5:57 | Flame spread at 6 ft. horizontally at the bottom of the 8 ft. wall. |
| 7:10 | Flames reached 8 ft. along the 8 ft. wall. |
| 8:38 | Flames on the LHS wall reached 10 ft. from the test corner. |
| 9:40 | Flames on the LHS wall reached 12 ft. extremity. |
| 10:38 | Test terminated. |

Post Test Observations:

The specimen was 100% melted from the C studs along all the walls. The gypsum board behind the specimen was flame bleached and charred in the test corner. Along the rear wall, the bottom of the wall was charred the length of the wall. On the RHS wall, 5 ft. of specimen was still intact near the doorway. The insulation on the LHS wall was melted completely with the exception of a small 2 ft. section attached to the C stud near the doorway. The insulation on the ceiling was 100% melted exposing the C studs.

Conclusion

The sample submitted, installed, and tested as described in this report displayed low levels of heat release, and upper level temperatures. The sample did not spread flames to the ceiling during the 40 kW exposure. The flames did spread to the extremities of the 12-foot walls during the 160 kW exposure. The sample did not exhibit flashover conditions during the test. NFPA 286 does not publish pass/fail criteria. One must consult the codes to determine pass-fail. This specimen did not meet the very strict criteria set forth in the 2003 IBC Section 803.2.1.

Test Standard Method ASTME 84-05

Examples 3-6 underwent tests carried out in accordance with Test Standard Method ASTME84-05 for Surface Burning Characteristics of Building Materials, (also published under the following designations ANSI 2.5; NFPA 255; UBC 8-1 (42-1); and UL723).

The method is for determining the comparative surface burning behaviour of building materials. This test is applicable to exposed surfaces, such as ceilings or walls, provided that the material or assembly of materials, by its own structural quality or the manner in which it is tested and intended for use, is capable of supporting itself in position or being supported during the test period.

The purpose of the method is to determine the relative burning behaviour of the material by observing the flame spread along the specimen. Flame spread and smoke density developed are reported. However, there is not necessarily a relationship between these two measurements.

It should be noted that the use of supporting materials on the underside of the test specimen may lower the flame spread index from that which might be obtained if the specimen could be tested without such support. This method may not be appropriate for obtaining comparative surface burning behaviour of some cellular plastic materials. Testing of materials that melt, drip, or delaminate to such a degree that the continuity of the flame front is destroyed, results in low flame spread indices that do not relate directly to indices obtained by testing materials that remain in place.

Table 1 gives detailed observations for the experiments conducted in Examples 3 to 15.

Example 3

The test specimen consisted of (3) 8 ft. long×24 in. wide× 1.398 in. thick 17.50 lbs metallized/double bubble/white poly (No-FR) reflective insulation, assembly of FIG. 2 secured to 1.75 in. wide×1 in. thick, aluminum frames using ¾ in. long, self-drilling, hex head screws and washers. The nominal thickness of the reflective insulation was 5/16 in. thick. The white poly was facing the flames during the test. The specimen was self-supporting and was placed directly on the inner ledges of the tunnel.

The test results, computed on the basis of observed flame front advance and electronic smoke density measurements were as follows.

| Test Specimen | Flame Spread Index | Smoke Developed Index |
| --- | --- | --- |
| Mineral Fiber Cement Board | 0 | 0 |
| Red Oak Flooring | 85 | 75 |
| Test Specimen | 5 | 5 |

This metallized-double bubble-white poly having no fire-retardant assembly of FIG. 2 was most acceptable in this E84-05 test to permit use in Class A buildings.

During the test, the specimen was observed to behave in the following manner:
The white poly facer began to melt at 0:05 (min:sec). The specimen ignited at 0:07 (min:sec). The insulation began to fall from the aluminum frames at 0:08 (min.sec.). The test continued for the 10:00 duration. After the test burners were turned off, a 60 second after flame was observed.

After the test the specimen was observed to be damaged as follows:
The specimen was consumed from 0 ft.-9 ft. The white poly facer was melted from 19 ft.-24 ft.

Example 4

Figure 3:
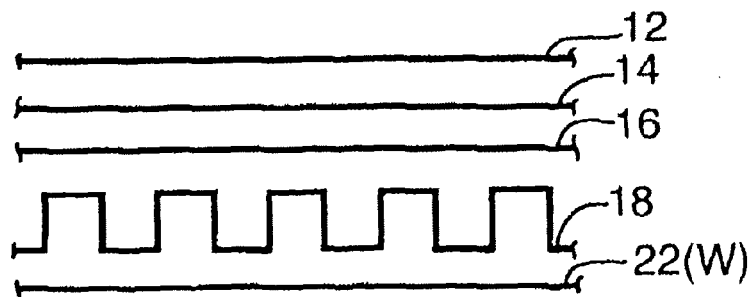
FIG. 3 represents a diagrammatic, exploded sectional view of a metallized-single bubble-white polyethylene without fire retardant assembly, according to the invention (Example 4)

This embodiment is a repeat of Example 3, but with a metallized/single bubble/white poly (No-FR) reflective insulation assembly as shown in FIG. 3 substituted for the material described in Example 3.
Specimen Description
The specimen consisted of (3) 8 ft. long×24 in. wide×1.100 in. thick 16.60 lbs metallized/single bubble/white poly (No-FR) reflective insulation, secured to 1.75 in. wide×1 in. thick, aluminum frames using ¾ in. long, self-drilling, hex head screws and washers. The nominal thickness of the reflective insulation was 3/16 in. thick. The white poly was facing the test burners. The specimen was self-supporting and was placed directly on the inner ledges of the tunnel.

| Test Material | Flame Spread Index | Smoke Developed Index |
| --- | --- | --- |
| Mineral Fiber Cement Board | 0 | 0 |
| Red Oak Flooring | 85 | 75 |
| Specimen | 5 | 0 |

During the test, the specimen was observed to behave in the following manner: The poly facer began to melt at 0:03 (min/sec). The poly facer ignited at 0:06 (min:sec). The insulation began to fall from the aluminum frames at 0:07 (min:sec). The insulation ignited on the floor of the apparatus at 0:07 (min:sec). The test continued for the 10:00 duration.

After the test the specimen was observed to be damaged as follows:
The insulation was consumed from 0 ft.-20 ft. The poly facer was melted from 20 ft.-24 ft. The polyethylene bubbles were melted from 20 ft. to 24 ft.

Example 5

This embodiment is a repeat of Example 3, but with a metallized/double bubble/metallized (No FR) reflective insulation substituted for the material described in Example 3.
Specimen Description
The specimen consisted of (3) 8 ft. long×24 in. wide×1.230 in. thick 17.40 lbs metallized/double bubble/metallized no FR reflective insulation assembly of FIG. 4, secured to 1.75 in. wide×1 in. thick, aluminum frames using ¾ in. long, self-drilling, hex head screws and washers. The nominal thickness of the reflective insulation was 5/16 in. thick. The specimen was self-supporting and was placed directly on the inner ledges of the tunnel.

| Test Material | Flame Spread Index | Smoke Developed Index |
| --- | --- | --- |
| Mineral Fiber Cement Board | 0 | 0 |
| Red Oak Flooring | 85 | 75 |
| Test Specimen | 5 | 5 |

During the test, the specimen was observed to behave in the following manner: The metallized insulation began to melt at 0:06 (min:sec). The metallized insulation began to fall from the aluminum frame at 0:10 (min.sec.). The metallized insulation ignited at 0:11 (min.sec). The test continued for the 10:00 duration. After the test burners were turned off, a 19 second after flame was observed.

After the test, the specimen was observed to be damaged as follows:
The metallized insulation was consumed from 0 ft.-16 ft. The polyethylene bubbles were melted from 16 ft.-24 ft. Light discoloration was observed to the metallized facer from 16 ft.-24

Figure 4:
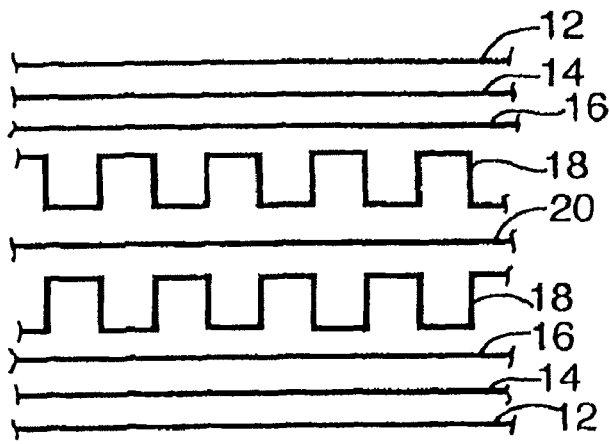
FIG. 4 represents a diagrammatic, exploded sectional view of a metallized-double bubble-metallized assembly without fire retardant, according to the invention (Example 5)

This metallized-double bubble-metallized assembly of FIG. 4 met the E84 standard for building reflective insulation.

Example 6

Figure 5:
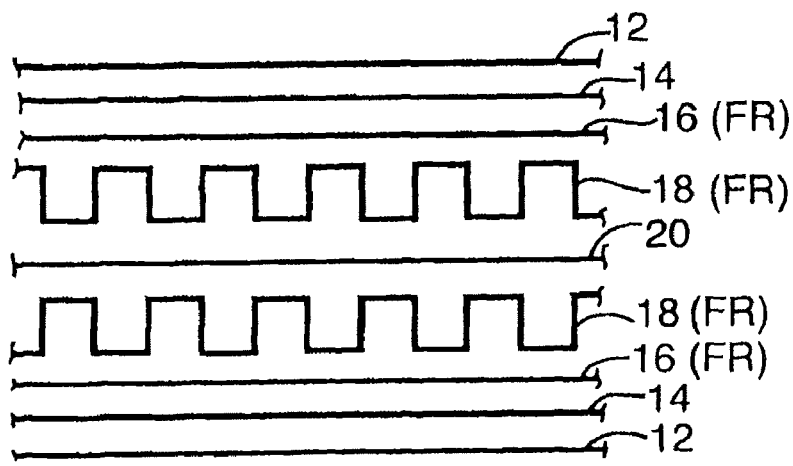
FIG. 5 represents a diagrammatic, exploded sectional view of a metallized-double bubble-metallized assembly with fire retardant, according to the invention (Example 6)
Figure 6:
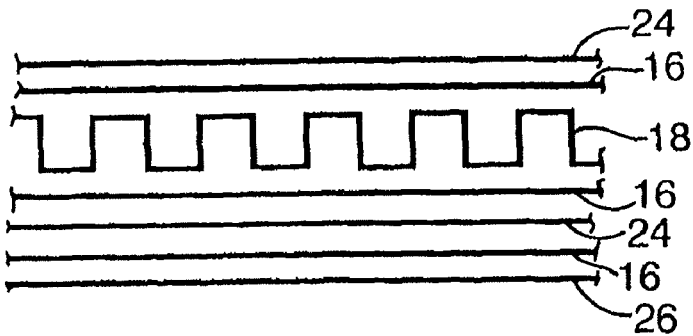
FIG. 6 represents a diagrammatic, exploded view or an aluminum foil-single bubble-aluminum foil-scrim without fire retardant according to the prior art (Example 7)

This embodiment is a repeat of Example 5, but with a metallized/double bubble/metallized (FR) reflective insulation assembly as seen in FIG. 5 substituted for the material described in Example 5, FIG. 4.

The specimen consisted of (3) 8 ft. long×24 in. wide×1.325 in. thick 17.70 lbs metallized/double bubble/metallized (FR) reflective insulation assembly, secured to 1.75 in. wide×1 in. thick, aluminum frames using % in. long, self-drilling, hex head screws and washers. The nominal thickness of the reflective insulation was 5/16 in. thick.

| Test Materials | Flame Spread Index | Smoke Developed Index |
|---|---|---|
| Mineral Fiber Cement Board | 0 | 0 |
| Red Oak Flooring | 85 | 75 |
| Test Specimen | 5 | 15 |

During the test, the specimen was observed to behave in the following manner: The metallized facer began to melt at 0:04 (min:sec.). The specimen ignited at 0:06 (min:sec.). The metallized insulation began to fall from the aluminum frames at 0:11 (min:sec). The floor of the apparatus ignited at 6:41 (min:sec). The test continued for the 10:00 duration. After the test burners were turned off, a 60 second after flame was observed.

After the test the specimen was observed to be damaged as follows: The insulation was consumed from 0 ft.-16 ft. The polyethylene bubbles were melted from 16 ft.-24 ft. Light discoloration was observed to the metallized facer from 16 ft.-24 ft.

The metallized-double bubble-metallized (FR) reflective insulation assembly of FIG. 5 passed this ASTM E84-05 test for Class A building insulation.

In the following embodiments Examples 7-9, less stringent ASTM E84 test conditions were employed.

Example 7

An aluminum foil-single bubble-aluminum foil/poly with polyester scrim reflective insulation assembly, without a fire-retardant was stapled to three 2×8 ft. wood frames with L-bars spaced every 5 feet O.C. was tested. The reflective insulation was secured to the L-bars by using self-drilling screws.
Flame Spread Index 50
Smoke Developed Index 50
This material failed this ASTM E84 test.

Example 8

Figure 7:
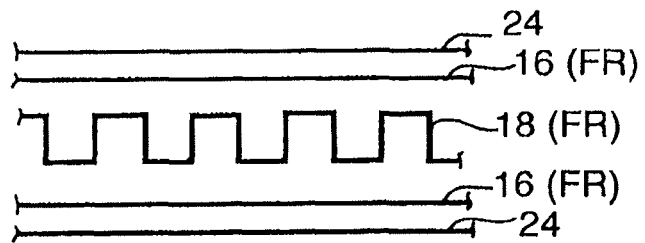
FIG. 7 represents a diagrammatic, exploded view of an aluminum foil-single bubble-aluminum foil with fire retardant reflective insulation assembly, not according to the invention (Example 8)

Aluminum foil-single bubble-aluminum foil with fire-retardant reflective insulation assembly was stapled to (3) 2×8 ft. wood frames, L-bar cross members on 5 ft. centers, stapled to wood on sides and screwed to L-bar. The sample was self-supporting. This assembly as shown in FIG. 7, failed this E84 test conditions for building insulations, for having a flame spread index of 55 and a smoke developed index of 30.

Example 9

Figure 8:
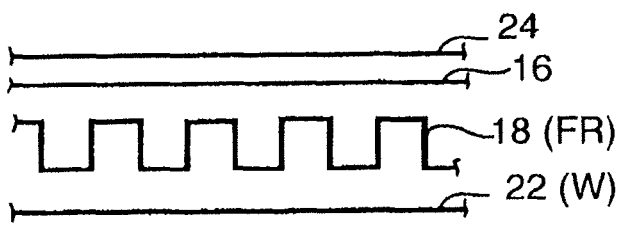
FIG. 8 represents a diagrammatic, exploded view of an aluminum foil-single bubble-white poly with fire retardant not according to the invention (Example 9)

Aluminum foil-single bubble-white poly (FR) as shown in FIG. 8 was attached to nominal 2×2 wood frames with L-bar cross members spaced every 5 ft. O.C. The sample was self-supporting.

The specimen had a flame speed index of 65 and a smoke developed index of 75 to not be acceptable as Class A building material.

The following embodiments describe ASTM 84-05e1 Surface Burning Characteristics of Building Materials.

Example 10

The following modified ASTM E84-05e1 test was designed to determine the relative surface burning characteristics of materials under specific test conditions. Results are again expressed in terms of flame spread index (FSI) and smoke developed (SD).

Summary of Test Procedure

The tunnel was preheated to 150° F., as measured by the floor-embedded thermocouple located 23.25 feet downstream of the burner ports, and allowed to cool to 105° F., as measured by the floor-embedded thermocouple located 13 ft. from the burners. At this time, the tunnel lid was raised and the test sample placed along the ledges of the tunnel so as to form a continuous ceiling 24 ft. long, 12 inches. above the floor. The lid was then lowered into place.

Upon ignition of the gas burners, the flame spread distance was observed and recorded every 15 seconds. Flame spread distance versus time is plotted ignoring any flame front recessions. If the area under the curve (A) is less than or equal to 97.5 min.-ft., FSI=0.515 A; if greater, FSI=4900/(195-A). Smoke developed is determined by comparing the area under the obscuration curve for the test sample to that of inorganic reinforced cement board and red oak, arbitrarily established as 0 and 100, respectively.

Figure 9:
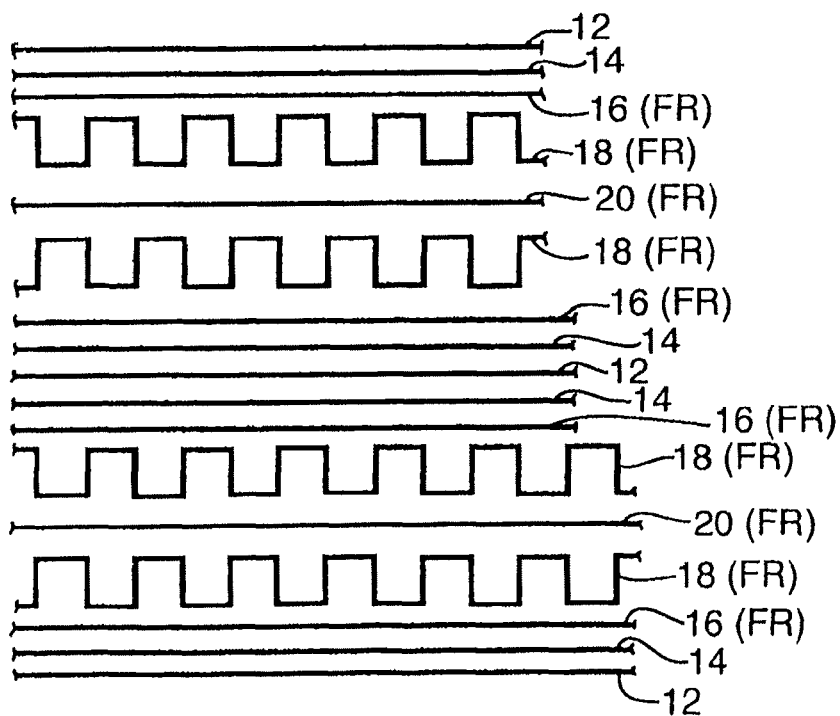
FIG. 9 represents an exploded view of a metallized-double bubble-metallized-double bubble-metallized assembly having fire retardant, according to the invention (Example 10)

The reflective insulation was a metallized-double bubble-metallized assembly with fire-retardant, as shown in FIG. 9. The material had a very acceptable OFSI and 85 SD.
Observations of Burning Characteristics The sample began to ignite and propagate flame immediately upon exposure to the test flame.

The sample did not propagate past the base line.

Maximum amounts of smoke developed were recorded during the early states of the test.

Example 11

Figure 10:
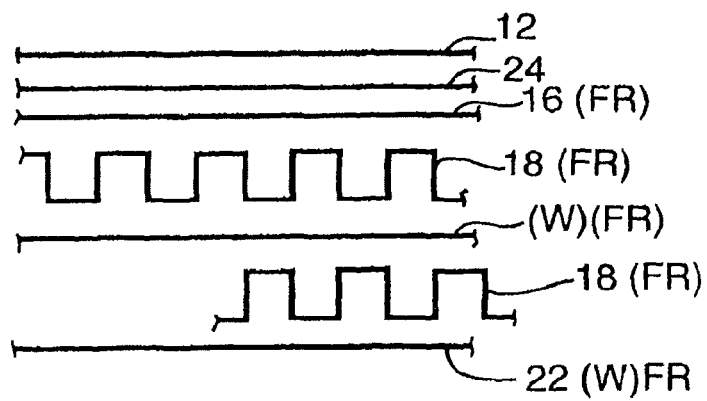
FIG. 10 represents an exploded view of a metallized double bubble-white polythene with fire retardant assembly, according to the invention (Example 11)

The test conditions were as for Example 10 but carried out with a metallized/bubble/single bubble, white (FR) as shown in FIG. 10, substituted for the material of Example 10.

The white face was exposed to the flame source. The material had a very acceptable 0 FSI and 65 DS.
Observations of Burning Characteristics The sample began to ignite and propagate flame immediately upon exposure to the test flame.

The sample did not afford a flame front propagation.

Maximum amounts of smoke developed were recorded during the early states of the test.

Example 12

Figure 11:
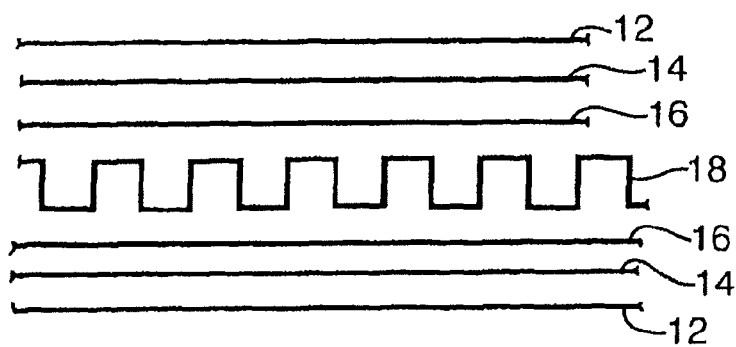
FIG. 11 represents an exploded view of a metallized-single bubble-metallized without fire retardant assembly, according to the invention (Example 12)

The test conditions were as for Example 10 but carried out with a metallized-single bubble as shown in FIG. 11, substitute for the material of Example 10.

The test material had a very accept 0 FSI and 30 SD.
Observations of Burning Characteristics The sample began to ignite and propagate flame immediately upon exposure to the test flame.

The sample did not afford a flame front propagation.

Maximum amounts of smoke developed were recorded during the early states of the test.

Example 13

Figure 12:
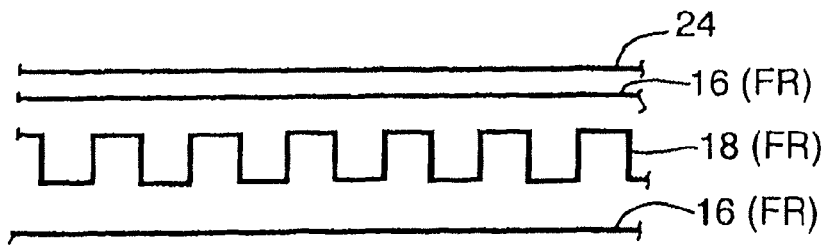
FIG. 12 represents an exploded view of an aluminum foil-single bubble containing fire retardant not according to the invention (Example 13)

The test conditions were as for Examples 7-9, with a self-supporting aluminum foil-single bubble containing fire retardant as shown in FIG. 12. An unacceptable FSI of 30 and a SDI of 65 was observed.

Example 14

Figure 13:
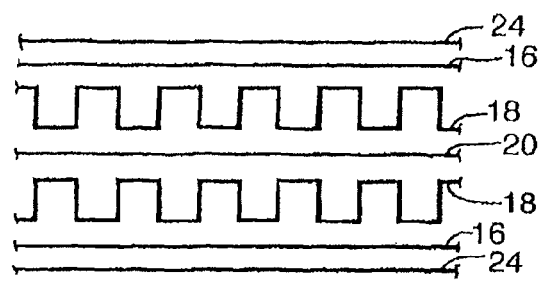
FIG. 13 represents an exploded view of an aluminum foil-double bubble-aluminum foil, according to the prior art (Examples 14 and 15)

The test was conducted under ASTM E84-00a Conditions in Jan. 22, 2002, with layers of aluminum foil-double bubble-aluminum foil, according to the prior art as shown in FIG. 13.

The specimen consisted of a 24" wide×24' long×5/16" thick (nominal) 3.06 lbs sheet of reflective insulation—foil/double PE bubble/foil. The specimen was tested with a 1/8" wide×24' long second of the foil facer removed from the center to expose the core material directly to the flames.
Results

| Test Specimen | Flame Spread Index | Smoke Developed Index |
|---|---|---|
| Mineral Fiber Cement Board | 0 | 0 |
| Red Oak Flooring | n/a | 100 |
| Sample | 115 | 20 |

During the test, the specimen was observed to behave in the following manner: Steady ignition began at 0:35 (min:sec). Flaming drops began to fall from the specimen at 0:45 and a floor flame began burning at 0:46. The test continued for the 10:00 duration. Upon completion of the test, the methane test burners were turned off and an after flame continued to burn for 0:19.

After the test, the specimen was observed to be damaged in the following manner: The specimen was slightly burned through from 1 ft. to 3 ft. The PE bubble was melted from 0 ft. to 24 ft. and the foil facer had a black discoloration on it from 2 ft. to 24 ft.

The sample was supported on 1/4" steel rods and 2" galvanized hexagonal wire mesh id not meet the criteria see for this E84-00a test for a building insulation.

Example 15

This example was a repeat of Example 14.
Results

| Test Specimen | Flame Spread Index | Smoke Developed Index |
|---|---|---|
| Mineral Fiber Cement Board | 0 | 0 |
| Red Oak Flooring | n/a | 100 |
| Sample | 65 | 35 |

During the test, the specimen was observed to behave in the following manner: Steady ignition began at 0:54 (min:sec). Flaming drops began to fall from the specimen at 0:58 and a floor flame began burning at 1:03. The test continued for the 10:00 duration.

After the test, the specimen was observed to be damaged as follows: The foil was 80% consumed from 1 ft. to 3 ft. and lightly discoloured from 3 ft. to 24 ft. The bubble core was melted/collapsed from 0 ft. to 24 ft.

Although the results were an improvement over Example 14 material, they were still not satisfactory.

TABLE

| EXAMPLE | 3 | 4 | 5 | 6 | 7 | 8 | 9 | 13 | 14 | 15 |
|---|---|---|---|---|---|---|---|---|---|---|
| Specimen Data | | | | | | | | | | |
| Time to Ignition (sec.) | 7 | 6 | 11 | 6 | 7 | 32 | 8 | 9 | 35 | 54 |
| Time to Max FS (sec.) | 23 | 22 | 26 | 23 | 64 | 81 | 38 | 28 | 284 | 191 |
| Maximum FS (feet) | 0.6 | 0.8 | 0.6 | 1.0 | 10.7 | 11.8 | 12.1 | 5.5 | 19.5 | 14.5 |
| Time to 980° F. (sec) | NR | NR | NR | NR | NR | NR | NR | NR | NR | NR |
| Max Temperature (° F.) | 447 | 416 | 482 | 476 | 470 | 561 | 582 | 520 | 728 | 711 |
| Time to Max Temperature (sec) | 597 | 600 | 596 | 565 | 599 | 82 | 48 | 594 | 316 | 127 |
| Total Fuel Burned (cubic feet) | 51.44 | 51.26 | 51.57 | 51.17 | 50.75 | 50.65 | 50.81 | 50.61 | 39.47 | 35.82 |
| FS* Time Area (ft* min) | 6.0 | 7.4 | 6.2 | 9.6 | 99.8 | 104.2 | 117.1 | 53.5 | 153.1 | 121.0 |
| Smoke Area (% A* min) | 2.3 | 1.1 | 3.2 | 10.8 | 41.7 | 26.5 | 65.0 | 53.4 | 22.2 | 33.4 |
| Fuel Area (° F.* min) | 3971.3 | 3668.6 | 4283.0 | 4324.4 | 4271.2 | 5035.3 | 5032.7 | 4554 | 5608.3 | 5556.9 |
| Fuel Contributed Value | 0 | 0 | 0 | 0 | 0 | 0 | 0 | 0 | 9 | 8 |
| Unrounded FSI | 3.1 | 3.8 | 3.2 | 4.9 | 51.5 | 54.0 | 62.9 | 27.5 | 117.0 | 66.2 |
| Calibration Data | | | | | | | | | | |
| Time to Ignition of Last Red Oak (sec.) | 44 | 44 | 44 | 44 | 41 | 41 | 41 | 41 | 50 | 55 |
| Red Oak Smoke Area (% A* min) | 62.50 | 62.50 | 62.50 | 62.50 | 85.0 | 85.0 | 85 | 85 | 100.00 | 101.02 |

TABLE-continued

| EXAMPLE | 3 | 4 | 5 | 6 | 7 | 8 | 9 | 13 | 14 | 15 |
|---|---|---|---|---|---|---|---|---|---|---|
| Red Oak Fuel Area (° F.* min) | 8972 | 8972 | 8972 | 8972 | 8128 | 8128 | 8128 | 8128 | 8548 | 9763 |
| Glass Fiber Board Fuel Area (° F.* min) | 5065 | 5065 | 5065 | 5065 | 5443 | 5443 | 5443 | 5443 | 5311 | 5178 |

*Never Reached

Example 16

Figure 17:
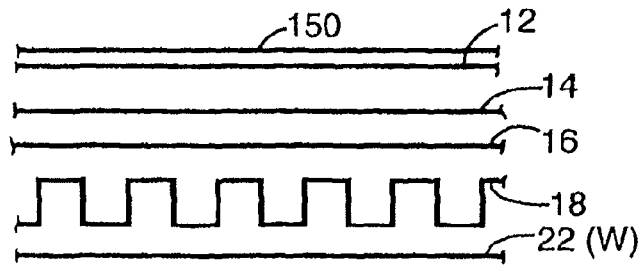
FIG. 17 is a clear lacquer-coated metallized embodiment of FIG. 3.

Standard Surface Emittance (reflectivity) tests (ASTM C 1371-04a—"Standard Test Method for Determination of Emittance of Materials near Room Temperature Using Portable Emissometers") with the embodiments shown in FIG. 3 and FIG. 17 gave a measured emittance of 0.30 (65% reflectance) for the dull surface of the metallized coated PET material and a value of 0.06 (96% reflectance) for the shiny surface.

The 0.5 ml thick lacquer coated metallized coated PET surface also gave an acceptable reflectance of 96%.

The lacquer layer 150 provides suitable, anti-corrosion protection.

Although this disclosure has described and illustrated certain preferred embodiments of the invention, it is to be understood that the invention is not restricted to those particular embodiments. Rather, the invention includes all embodiments, which are functional or mechanical equivalence of the specific embodiments and features that have been described and illustrated.

The invention claimed is:

1. An object requiring a Class A standard thermal insulation, characterized by a flame spread speed rating value of from 0 to 25 and a smoke developed rating value of 0 to 450, said object being insulated with metallized insulation material which includes a reflective metallized polymeric film having a foil-free metallized surface, said metallized polymeric film having a clear anti-corrosion lacquer coating thereon while retaining effective surface emissivity of said exposed surface.

2. An object as claimed in claim 1 being an object selected from the group consisting of packaging; a vehicle; and a residential, commercial, industrial building or establishment requiring Class A insulation.

3. An object as claimed in claim 1 wherein the insulation comprises a bubble-pack assembly comprising:
   (i) a first thermoplastic film having a plurality of portions wherein each of said portions defines a cavity;
   (ii) a second thermoplastic film in sealed engagement with said first film to provide a plurality of closed said cavities; and
   (iii) at least one layer of a metallized thermoplastic film; and wherein at least one of said first or second films contains an effective amount of a fire-retardant material.

4. An object as claimed in claim 3 wherein the bubble-pack assembly comprises:
   (i) a first bubble pack having a first thermoplastic film having a plurality of portions wherein each of said portions defines a cavity and a second thermoplastic film in sealed engagement with said first film to provide a plurality of closed said cavities; and
   (ii) a second bubble-pack having a third thermoplastic film having a plurality of portions wherein each of said portions defines a cavity and a fourth thermoplastic film in sealed engagement with said third thermoplastic film to provide a plurality of closed said cavities.

5. An object as claimed in claim 3 wherein said bubble-pack assembly comprises
   (i) a first bubble pack having a first thermoplastic film having a plurality of portions wherein each of said portions defines a cavity and a second thermoplastic film in sealed engagement with said first thermoplastic film to provide a plurality of closed said cavities; and
   (ii) a second bubble-pack having a third thermoplastic film having a plurality of portions wherein each of said portions defines a cavity and a fourth thermoplastic film in sealed engagement with said third thermoplastic film to provide a plurality of closed said cavities; a metallized thermoplastic film interposed between and bonded to said first bubble pack and said second bubble pack; and wherein at least one of said first second, third, fourth or additional thermoplastic films contains an effective amount of a fire-retardant material.

6. An object as claimed in claim 3 wherein said bubble-pack assembly has at least one outer layer of said metallized thermoplastic film.

7. An object as claimed in claim 6 having two outer layers wherein both outer layers of said bubble-pack assembly are formed of said metallized thermoplastic film.

8. An object as claimed in claim 3 wherein said assembly further comprises at least one or a plurality of additional thermoplastic films.

9. An object as claimed in claim 5 wherein at least one of said first, second, third, fourth or additional thermoplastic films contains an effective amount of a fire-retardant material.

10. An object as claimed in claim 1 wherein said metallized thermoplastic film contains a fire-retardant material.

11. An object as claimed in claim 1 wherein said metallized thermoplastic film is a metallized polyester film.

12. An object as claimed in claim 3 wherein said effective amount of said fire retardant material is 10-25% w/w fire-retardant.

13. An object as claimed in claim 3 wherein said metal is aluminum.

14. An object insulated with a reflective Class A standard thermal insulation characterized by a flame spread speed rating value of from 0 to 25 and a smoke developed rating value of 0 to 450, said object being insulated with metallized insulation material comprising a reflective metallized polymeric film having a foil-free metallized surface.

15. The object as claimed in claim 14 wherein said insulation material further comprises a polymeric material selected from the group consisting of a closed cell foam, polyethylene foam, polypropylene foam, multi-layers assembly and a bubble-pack assembly.

16. The object as claimed in claim 15 wherein the insulation material comprises a bubble-pack insulation assembly.

17. The object as claimed in claim 16 wherein the bubble pack insulation assembly is free of fire retardant additive.

18. The object as claimed in claim 16 wherein the bubble-pack insulation assembly comprises a plurality of bubbled thermoplastic film bonded to each other with added fire retardant incorporated within one or more of said bubbled films.

19. The object as claimed in claim 14 wherein the metallized polymeric film provides an effective surface emissivity of the exposed surface.

20. The object as claimed in claim 14 wherein the surface thermal emissivity is equivalent to or greater than 95% reflectance.

21. The object as claimed in one of claims 14-20 wherein said metallized polymeric film has a clear, anti-corrosion lacquer coating thereon.

* * * * *